(12) United States Patent
Brewer et al.

(10) Patent No.: US 6,238,002 B1
(45) Date of Patent: May 29, 2001

(54) SEAT RECLINING MECHANISM WITH INTEGRATED SEAT ARMREST FEATURES

(75) Inventors: William S. Brewer, Pinckney; Mark A. Pattok, Allegan; Gregory Steinke, Eastpointe; Glenn Scott, Dexter, all of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/415,379

(22) Filed: Oct. 8, 1999

(51) Int. Cl.[7] ........................................................ B60N 2/46
(52) U.S. Cl. ............................... 297/411.32; 297/378.12; 297/411.39
(58) Field of Search .......................... 297/378.12, 411.32, 297/411.38, 411.39

(56) References Cited

U.S. PATENT DOCUMENTS

| | | |
|---|---|---|
| 4,881,778 | 11/1989 | Stephenson et al. |
| 4,886,317 | 12/1989 | Konzmann et al. ............ 297/411.39 |
| 4,968,095 | 11/1990 | Moyer . |
| 4,978,170 | 12/1990 | Pelz et al. ........................ 297/411.39 |
| 5,033,792 * | 7/1991 | Kanazawa ....................... 297/411.32 |
| 6,076,890 * | 6/2000 | Yoshida et al. ............. 297/411.32 X |

* cited by examiner

Primary Examiner—Peter R. Brown
(74) Attorney, Agent, or Firm—Foley & Lardner

(57) ABSTRACT

A seat back assembly for a vehicle including a seat back, a pivot device having a pivot axis, and an armrest. The seat back is connected to the pivot device for rotational movement relative to the seat cushion between an upright position and a folded position. The armrest is connected to the pivot device for rotational movement relative to the seat back between a deployed position and retracted position. Both the seat back and the armrest pivot about a common pivot axis. The seat back assembly (1) impedes the rotational movement of the armrest beyond the retracted position; (2) holds the armrest in the retracted position when the seat back is in the fold position; and (3) urges the arm rest from the deployed position to the retracted position during rotational movement of the seat back from the upright position to the folded position.

16 Claims, 3 Drawing Sheets

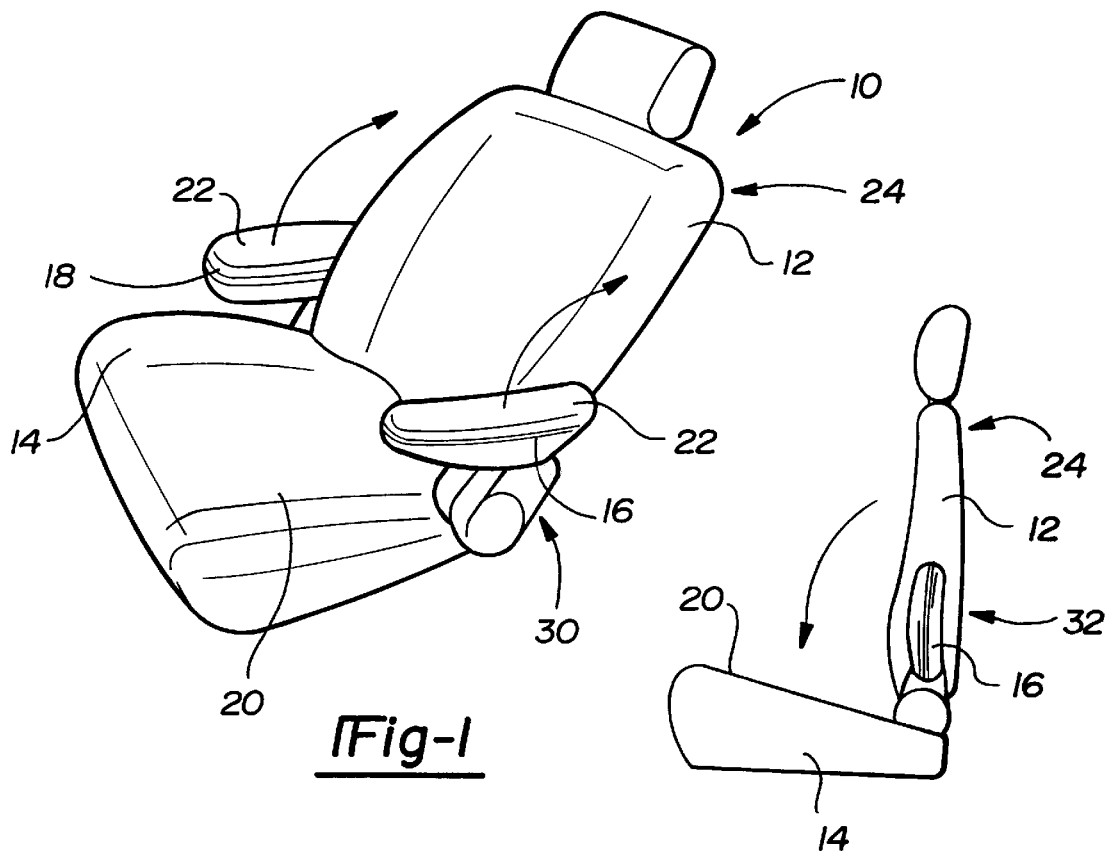
Fig-1
Fig-2
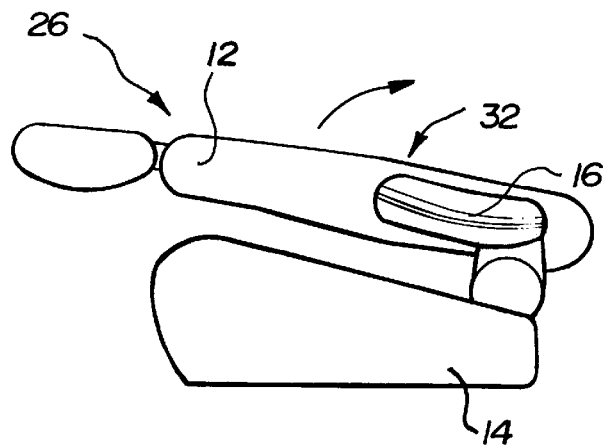
Fig-3
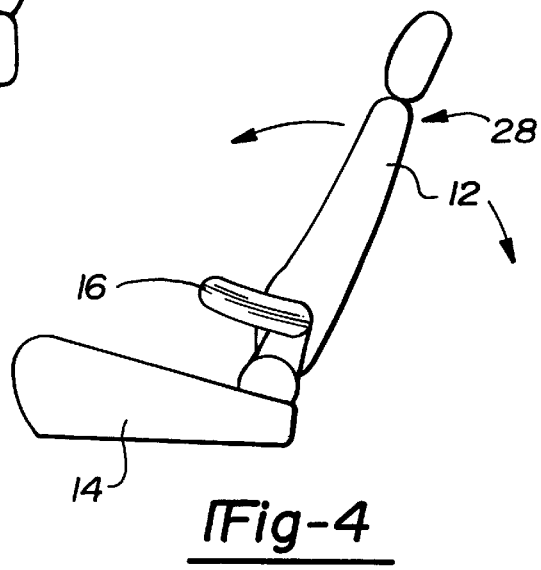
Fig-4

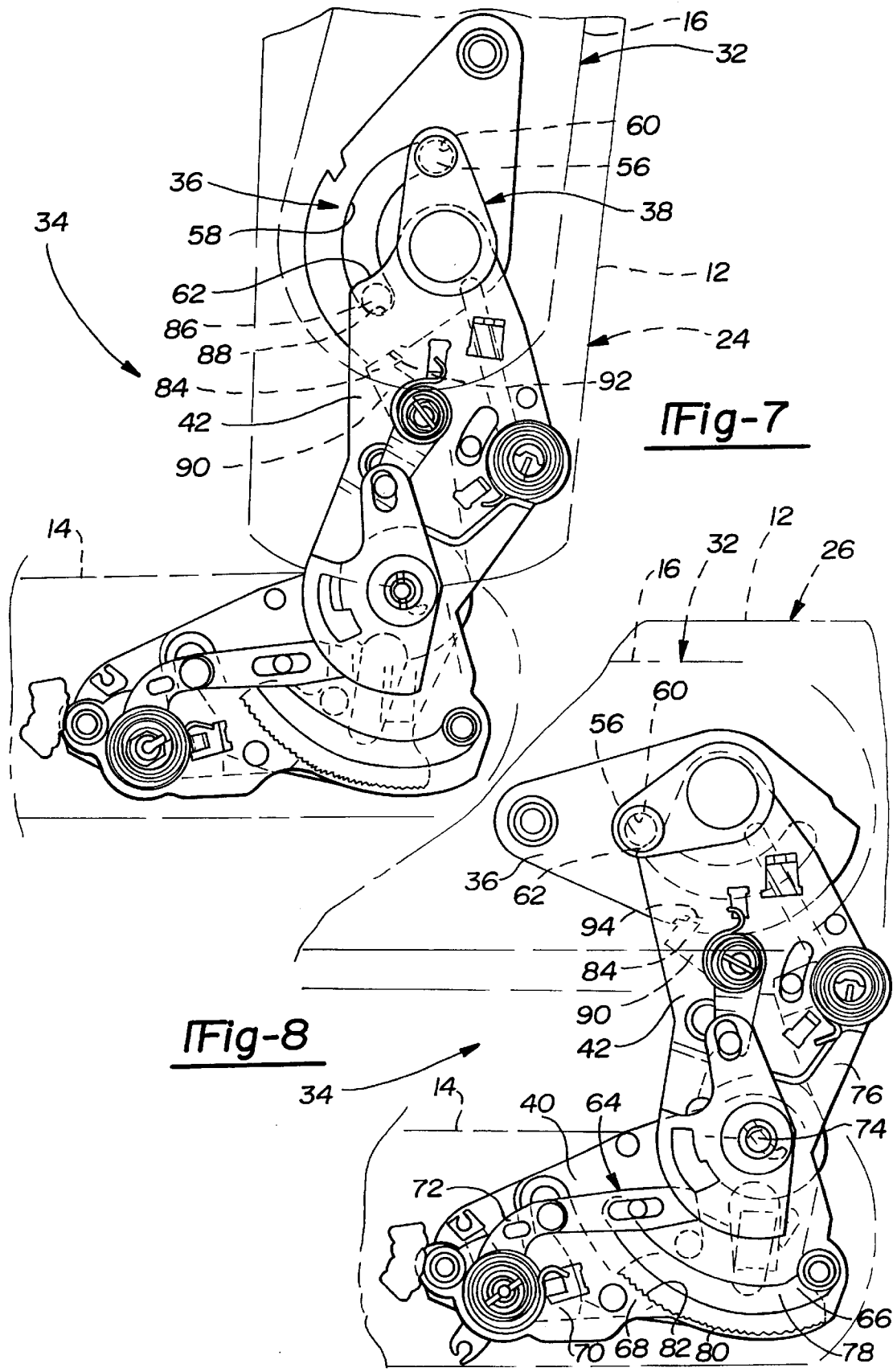

SEAT RECLINING MECHANISM WITH INTEGRATED SEAT ARMREST FEATURES

TECHNICAL FIELD OF THE INVENTION

This invention generally relates to seat assemblies for motor vehicles. More specifically, this invention relates to vehicle seat assemblies that include a seat back connected to a pivot device for rotational movement relative to a seat cushion and an armrest connected to the pivot device for rotational movement relative to the seat back.

BACKGROUND

One of the significant reasons for the popularity of the minivan type vehicle is the versatility of its interior space. The interior space may be filled with seat assemblies for the use of one or more occupants, may be emptied of seat assemblies for the loading of large cargo, such as plywood or furniture, or may be used with any combination of the two options. To increase the comfort of the occupants, many automotive manufacturers are including so-called captain chairs as the seat assemblies. Captain chairs differ from other seat assemblies in that they typically include a seating surface for only one person and a much taller seat back equipped with one or two armrests. To keep the versatility of the interior space, the seat backs of these captain chairs may be rotated forward from an upright position to a folded position. In the folded position, the rear portion of the seat back is relatively flat and can accommodate the loading of some cargo. To increase the versatility even further, seats may be removed altogether from the vehicle.

Because of their size, however, the captain chairs have proved difficult to remove from the vehicle. Without any handles, which would be obtrusive in the upright position, most users of the vehicle desire to lift the folded seat assembly by the armrests, and not the actual seat back or seat cushion. This desire presents a particular problem as the seat assemblies of the conventional design do not incorporate any device to lock the armrests into place. Thus, there is need for a seat assembly equipped with armrests that are held in one position when the seat back is in the folded position. In addition to this need, designers of automotive components and systems continually strive to reduce the cost, weight and complexity of such products.

SUMMARY OF THE INVENTION

Accordingly, this invention provides a vehicle seat assembly that overcomes the problems and disadvantages of the conventional techniques in the art. The invention also provides a vehicle seat assembly equipped with armrests that are held in a retracted position when the seat back is in the folded position. Further, the invention provides a vehicle seat assembly equipped with armrests that are urged into the retracted position during rotational movement of the seat back from the upright position to the folded position. Further still, the invention provides a vehicle seat assembly that includes a simplified package, which reduces the number of seat components and overall mass of the vehicle seat assembly.

Briefly, the seat back assembly of the invention includes a seat back, a pivot device having a pivot axis, and an armrest. The seat back is connected to the pivot device for rotational movement relative to a seat cushion between an upright position and a folded position. The armrest is connected to the pivot device for rotational movement relative to the seat back between a deployed position and a retracted position. Both the seat back and the armrest pivot about a common pivot axis. The seat back assembly (1) impedes the rotational movement of the armrest beyond the retracted position; (2) holds the armrest in the retracted position when the seat back is in the folded position; and (3) urges the armrest from the deployed position to the retracted position during rotational movement of the seat back from the upright position to the folded position.

BRIEF DESCRIPTION OF THE DRAWINGS

Further features and advantages of the invention will become apparent from the following discussion and accompanying drawings, in which:

FIG. 1 is a perspective view of a vehicle seat assembly according to an embodiment of the invention, with the seat back in an upright position and the armrests in a deployed position;

FIG. 2 is a side view of the vehicle seat assembly of FIG. 1, with the armrests in a retracted position;

FIG. 3 is a side view of the vehicle seat assembly of FIG. 1, with the seat back in a folded position and armrests in the retracted position;

FIG 4 is a side view of the vehicle seat assembly of FIG. 1, with the seat back in an angle-adjusted position and the armrests in the deployed position;

FIG. 7 is a side view of the pivot device of FIG. 5, with the armrests in the retracted position; and FIG. 8 is a side view of the pivot device of FIG. 5, with the seat back in the folded position and the armrests in the retracted position.

DETAILED DESCRIPTION OF THE PREFERRED EMBODIMENT

Figure 5:
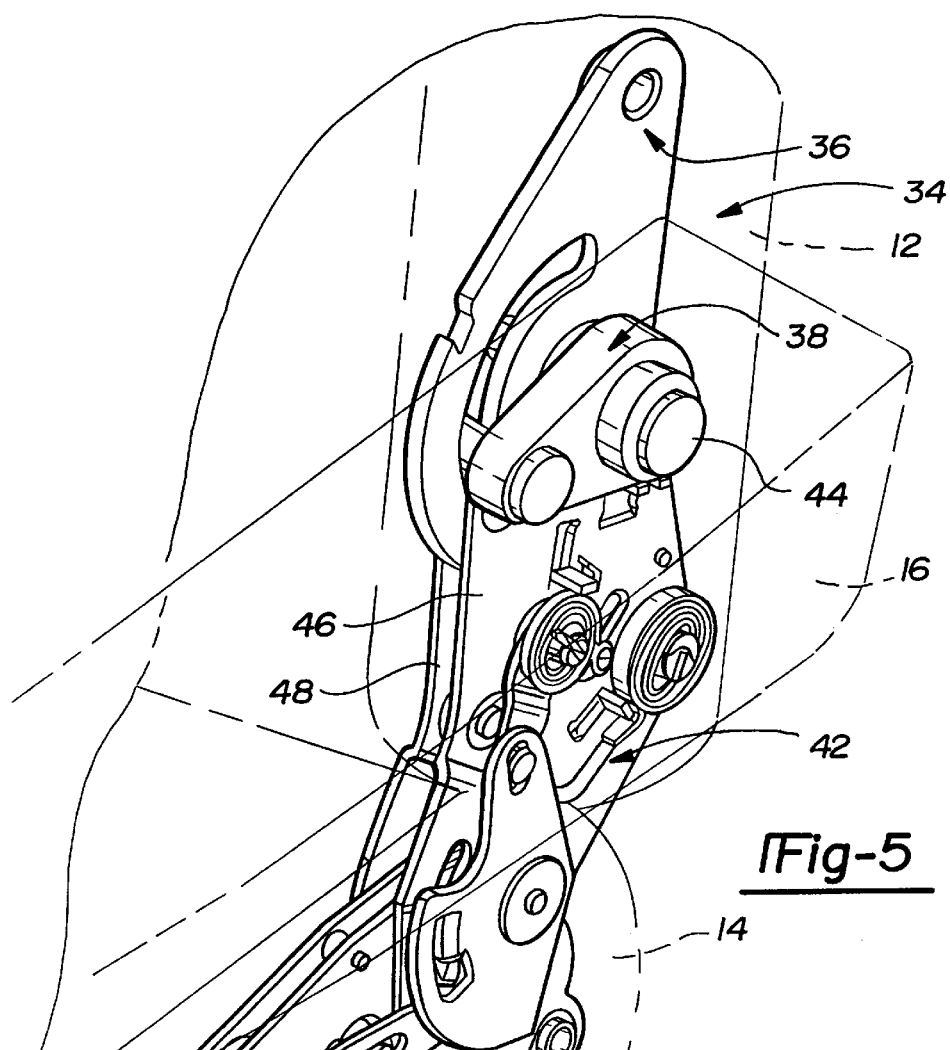
FIG. 5 is a perspective view of a pivot device according to an embodiment of the invention, with the seat back in the upright position and the armrests in the deployed position.

The following description of the preferred embodiment is merely exemplary in nature, and is in no way intended to limit the invention, or its application, or uses.

As shown in FIG. 1, a vehicle seat assembly 10 of the invention includes a seat back 12, a seat cushion 14, a left armrest 16, and a right armrest 18. Cooperatively, the seat back 12, the seat cushion 14, and the armrests 16 and 18 provide the typical attributes of a vehicle seat; the seat back 12 and the seat cushion 14 provide a seating surface 20 for an occupant (not shown) and the armrests 16 and 18 provide a resting surface 22 for each arm of the occupant. In alternative embodiments of the invention, the seat back 12 and the seat cushion 14 may provide more than one seating surface, such as a two or three person bench seat. Further, the vehicle seat assembly 10 may include only one armrest, typically located on an inboard side of a single seating surface seat, or may include more than two armrests, for a multi-seating surface seat. The seat cushion 14, the seat back 12, and the armrests 16 and 18 of the preferred embodiment are made from conventional materials and in a conventional manner.

As shown in FIGS. 1–3, the seat back 12 is connected for rotational movement between an upright position 24, which is generally perpendicular to the seat cushion 14, and a folded position 26, which is generally parallel with the seat cushion 14. The term "generally perpendicular" includes about a 10° deviation (80°–100°) from exactly perpendicular (90°). While in the upright position 24, the seat back 12 provides the seating surface 20, and in the folded position 26 the seat back 12 increases the storage capacity of a vehicle. As shown in FIG. 4, the seat back 12 is also connected for rotational movement to a variable angle-adjusted position 28. While in the angle-adjusted position 28, the seat back 12 provides extra comfort to those occupants seeking a more reclined seat back seating surface relative to the seat cushion 14.

As shown in FIGS. 1–3, the armrests 16 and 18 are connected for rotational movement between a deployed position 30, which is generally perpendicular to the seat back 12, and a retracted position 32, which is generally parallel with the seat back 12. While in the deployed position 30, the armrests 16 and 18 provide the resting surface 22, and in the retracted position 32 the armrests 16 and 18 ease the ingress and egress of an occupant in and out of the vehicle seat assembly 10. The retracted position 32 of the armrests 16 and 18 are determined by their position relative to the seat back 12, not relative to the seat cushion 14.

In addition to the attributes noted above, the vehicle seat assembly 10 of the invention (1) impedes the rotational movement of the armrests 16 and 18 beyond the retracted position 32; (2) holds the armrests 16 and 18 in the retracted position 32 when the seat back 12 is in the folded position 26; and (3) urges the armrests 16 and 18 from the deployed position 30 to the retracted position 32 during rotational movement of the seat back 12 from the upright position 24 to the folded position 26. These features of the vehicle seat assembly 10 are provided by a pivot device 34, as shown in FIG. 5 and explained below.

The pivot device 34 functions to pivot the seat back 12 relative to the seat cushion 14, and to pivot the armrest 16 relative to the seat back 12. In the preferred embodiment of the invention, the vehicle seat assembly includes two pivot devices, a left version located of the left side of the vehicle seat assembly and a right version located on the right side of the vehicle seat assembly. The left version and the right version are mirror images of each other and are functionally identical. For this reason, only the left version is further described. In an alternative embodiment of the invention, the vehicle seat assembly may include only one pivot device, located on either side of the vehicle seat assembly or may be located between the sides of the vehicle seat assembly particularly in a multi-seating surface seat.

The pivot device 34 includes a seat back bracket 36, an armrest bracket 38, and a seat cushion bracket 40. The seat back bracket 36, the armrest bracket 38, and the seat cushion bracket 40 provide the structure to attach the pivot device 34 to the seat back 12, the armrest 16, and the seat cushion 14, respectively. These attachments may be accomplished with fasteners (not shown) or any other appropriate attachment method or device. In an alternative embodiment of the invention, the seat back bracket 36 may be integrally formed with the seat back 12 (i.e. integrated with a support frame of the seat back). Likewise, the seat cushion bracket 40 may be integrally formed with the seat cushion 14 (i.e. integrated with a seat cushion support frame).

The pivot device 34 also includes an intermediate member 42 and a shoulder bolt 44. In the preferred embodiment of the invention, the intermediate member 42 includes a first plate 46 and a second plate 48, which are distanced by several spacers (not shown) to allow movement of the seat back bracket 36 between the first plate 46 and the second plate 48. In alternative embodiments of the invention, the intermediate member 42 may include only one plate, or may include more than two plates.

Figure 6:
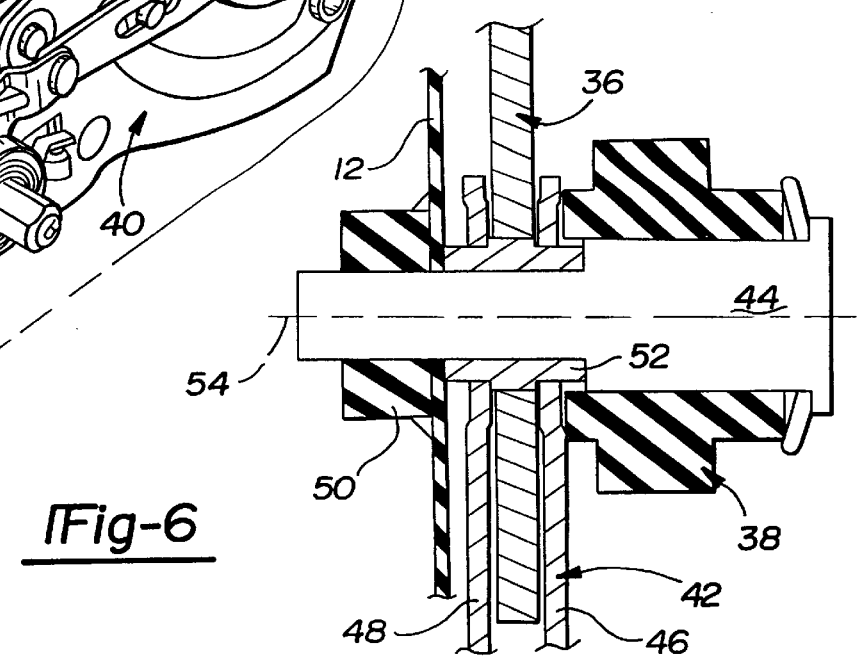
FIG 6 is a cross-sectional view of the pivot device along the line 6—6 of FIG. 5.

As shown in FIG. 6, the shoulder bolt 44 is rotatably secured to the seat back 12 by a threaded interaction with a nut 50 that is welded to the seat back 12. In the preferred embodiment of the invention, both the armrest bracket 38 and a collar 52 are placed on the shoulder bolt 44. The collar 52 provides rotational support for the first plate 46 and the second plate 48 of the intermediate member 42 and for the seat back bracket 36. The shoulder bolt 44 allows rotational movement of the seat back bracket 36 relative to the intermediate member 42, thereby allowing the rotational movement of the seat back 12 between the upright position and the folded position. The shoulder bolt 44 also allows rotational movement of the armrest bracket 38 relative to the seat back bracket 36, thereby allowing rotational movement of the armrest between the deployed position and the retracted position. In the process of allowing rotational movement of both the seat back 12 and the armrest, the shoulder bolt 44 defines a common pivot axis 54.

As shown in FIG. 7, the armrest bracket 38 includes a stop pin 56, which engages an arcuate slot 58 located on the seat back bracket 36. The stop pin 56 moves within the arcuate slot 58 between an upper stop surface 60, located at one end of the arcuate slot 58, and a lower stop surface 62, located on the intermediate member 42. While the seat back 12 is in the upright position 24, the interaction between the stop pin 56 and the upper stop surface 60 impedes the armrest 16 from rotational movement beyond the retracted position 32. In the other direction, the interaction between the stop pin 56 and the lower stop surface 62 impedes the armrest 16 from rotational movement beyond the deployed position, thereby allowing the occupant to apply pressure or load to the armrest 16 without further rotating the armrest 16 beyond the deployed position.

When the seat back 12 is rotated into the folded position 26, as shown in FIG. 8, the seat back bracket 36 rotates relative to the intermediate member 42 and consequently, the upper stop surface 60 moves relative to the lower stop surface 62. If the armrest 16 is in the deployed position during the rotational movement of the seat back 12, the armrest 16 will remain stationary, but will be effectively urged into the retracted position 32 by the interaction between the stop pin 56 and the lower stop surface 62. On the other hand, if the armrest 16 is in the retracted position 32 the armrest 16 will remain in the retracted position 32, but will be rotated with the seat back 12 by the interaction between the stop pin 56 and the upper stop surface 60.

With the seat back 12 in the folded position 26, and the armrest 16 in the retracted position 32, the stop pin 56 is effectively locked into one place by the interactions between the stop pin 56 and the upper stop surface 60 and between the stop pin 56 and the lower stop surface 62. Thus, these interactions hold the armrest 16 in the retracted position 32 when the seat back 12 is in the folded position 26, thereby allowing a user to lift the vehicle seat assembly, if the vehicle seat assembly is removable from the vehicle.

To allow adjustment of the relative angle between the seat back 12 and the seat cushion 14, the intermediate member 42 is pivotally connected to the seat cushion bracket 40 with a pawl and sector manual recliner device 64. The pawl and sector manual recliner device 64 includes a sector 66, a pawl 68, a cam 70, a handle 72, and a sector spring (not shown). The sector 66 rotates about a second pivot axis 74 and includes an upper portion 76 secured to the intermediate member 42 and a lower portion 78 with several sector teeth 80. One side of the pawl 68, which includes several pawl teeth 82, engages the sector teeth 80 of the sector 66 to prevent further rotation of the sector 66, while the other side of the pawl 68 engages the cam 70. The cam 70, which is moved with the handle 72, moves the pawl 68 into and out of engagement with the sector 66 to allow the adjustment of the relative angle between the seat back 12 and the seat cushion 14. The sector spring, which is centered on the second pivot axis 74, functions to bias the seat back 12 into the upright position.

When the handle 72 is operated, the cam 70 is rotated out of engagement with the pawl 68, and the pawl 68 is moved out of engagement with the sector 66. At this point, the occupant can now lean in either direction, within travel limits, to the desired angle-adjusted position. When the handle 72 is released, the cam 70 moves into engagement with the pawl 68. The pawl 68, in turn, moves into engagement with the sector 66, thus locking the recliner device in place and fixing the relative angle between the seat back 12 and the seat cushion 14.

As shown in FIG. 7, the pivot device 34 of the preferred embodiment also includes a dump mechanism 84 that allows the seat back 12 to rotate about the pivot axis between the upright position 24, generally perpendicular to the seat cushion 14, and a folded position, generally parallel to the seat cushion 14. In the upright position 24, a stationary pin 86 engages a slot surface 88 of the arcuate slot 58 and a latch 90 engages a bracket surface 92 of the seat back bracket 36 to positively hold the seat back 12. The latch 90 is disengagable from the bracket surface 92 to allow forward rotational movement of the seat back 12 to the folded position. In the folded position 26, as shown in FIG. 8, the latch 90 of the dump mechanism 84 engages a slot 94 to positively hold the seat back 12. The pivot device 34 may also include an appropriate mechanism to adjust the relative angle between the intermediate member 42 and the seat cushion bracket 40 when the seat back 12 is rotated to the folded position 26.

Recliner devices, such as the pawl and sector manual recliner device 64 as described above, are known and used in the art of vehicle seat assemblies and a person of ordinary skill in the art would readily understand how to make and use such a recliner device. In alternative embodiments of the invention, the intermediate member 42 may be connected to the seat cushion 14 with other manual recliner devices, such as gear reduced, linear, and rotary manual recliner devices or may be connected with power recliner devices or other recliner devices with equal results. Further, the intermediate member 42 may be directly secured to the seat cushion bracket 40 without any recliner device, in order to reduce cost and mass of the vehicle seat assembly as a compromise of not providing rotation of the seat back 12 into the angle-adjusted position.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

We claim:

1. A seat back assembly for a vehicle comprising:
    a pivot device having a pivot axis;
    a seat back connected to said pivot device for rotational movement about said pivot axis between an upright position generally perpendicular to a seat cushion and a folded position generally parallel with the seat cushion; and an armrest connected to said pivot device for rotational movement about said pivot axis between a deployed position generally perpendicular to said seat back and a retracted position generally parallel with said seat back, said pivot device including an intermediate member, a seat back bracket connected to said seat back and pivotally connected to said intermediate member for rotational movement of said seat back; and
    an armrest bracket connected to said armrest and pivotally connected to said intermediate member for rotational movement of said seat back,
    said seat back bracket including a first surface and said armrest bracket including a second surface, said second surface being engagable with said first surface to impede said armrest from rotational movement beyond said retracted position,
    said intermediate member including a third surface and said armrest bracket includes a fourth surface substantially opposite said second surface, said fourth surface being engagable with said third surface to hold said armrest in said retracted position when said seat back is in said folded position,
    wherein said fourth surface is engagable with said third surface to urge said armrest from said deployed position to said retracted position during rotational movement of seat back from said upright position to said folded position.

2. The seat back assembly of claim 1 wherein said intermediate member is pivotally connected to the seat cushion to allow adjustment of the relative angle between said seat back and the seat cushion.

3. The seat back assembly of claim 1 wherein said seat back provides a seating surface for one occupant.

4. A seat back assembly for a vehicle comprising:
    a seat back;
    an armrest;
    a pivoting means connected to said seat back for pivoting said seat back relative to a seat cushion, and connected to said armrest for pivoting said armrest relative to said seat back, said pivoting means pivoting said seat back and said armrest about a common pivot axis, and
    an urging means connected to said armrest for urging said armrest from said deployed position to said retracted position during a pivoting of said seat back from said upright position to said folded position.

5. The seat back assembly of claim 4 wherein said pivoting means pivots said seat back between an upright position generally perpendicular to the seat cushion and a folded position generally parallel with the seat cushion.

6. The seat back assembly of claim 5 wherein said pivoting means pivots said armrest between a deployed position generally perpendicular to said seat back and a retracted position generally parallel with said seat back.

7. The seat back assembly of claim 6 further comprising an impeding means connected to said armrest for impeding said armrest from pivoting beyond said retracted position.

8. The seat back assembly of claim 7 further comprising a holding means connected to said armrest for holding said armrest in said retracted position when said seat back is in said folded position.

9. The seat back assembly of claim 4 further comprising an angle adjusting means connected to said seat cushion for adjusting the relative angle between said seat back and the seat cushion.

10. The seat back assembly of claim 4 wherein said seat back provides a seating surface for one occupant.

11. A seat back assembly for a vehicle comprising:
a seat cushion;
a seat back;
an armrest; and
a pivot device having a pivot axis, and including an intermediate member, a seat back bracket, and an armrest bracket, said intermediate member being connected to said seat cushion, said seat back bracket being connected to said seat back and pivotally connected to said intermediate member for rotational movement of said seat back about said pivot axis between an upright position generally perpendicular to said seat cushion and a folded position generally parallel with said seat cushion, said armrest bracket being connected to said armrest and pivotally connected to said intermediate member for rotational movement of said armrest about said pivot axis between a deployed position generally perpendicular to said seat back and a retracted position generally parallel with said seat back,
wherein said seat back bracket includes an arcuate slot defining an upper stop surface, said armrest bracket includes a stop pin, and said intermediate member defines a lower stop surface, said stop pin being engagable with said arcuate slot, said stop pin engageable with the upper and lower stop surfaces.

12. The vehicle seat assembly of claim 11 wherein said stop pin is engagable with said upper stop surface to impede said armrest from rotational movement beyond said retracted position.

13. The vehicle seat assembly of claim 12 wherein said stop pin is engagable with said lower stop surface to hold said armrest in said retracted position when said seat back is in said folded position.

14. The vehicle seat assembly of claim 13 wherein said lower stop surface is engageable with said stop pin to urge said armrest from said deployed position to said retracted position during rotational movement of said seat back from said upright position to said folded position.

15. The vehicle seat assembly of claim 11 wherein said intermediate member is pivotally connected to said seat cushion to allow adjustment of the relative angle between said seat back and said seat cushion.

16. The vehicle seat back assembly of claim 11 wherein said seat back and said seat cushion cooperate to provide a seating surface for one occupant.

* * * * *